March 1, 1955 R. FRASER 2,703,380
PHASE COMPARISON APPARATUS FOR DATA TRANSMISSION SYSTEMS
Filed Sept. 21, 1949 2 Sheets-Sheet 1

INVENTOR
ROBERT FRASER
BY
Paul B. Hunter
ATTORNEY

March 1, 1955 R. FRASER 2,703,380
PHASE COMPARISON APPARATUS FOR DATA TRANSMISSION SYSTEMS
Filed Sept. 21, 1949 2 Sheets-Sheet 2
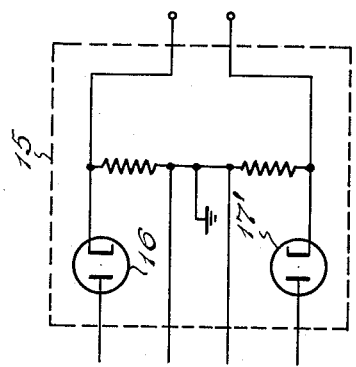
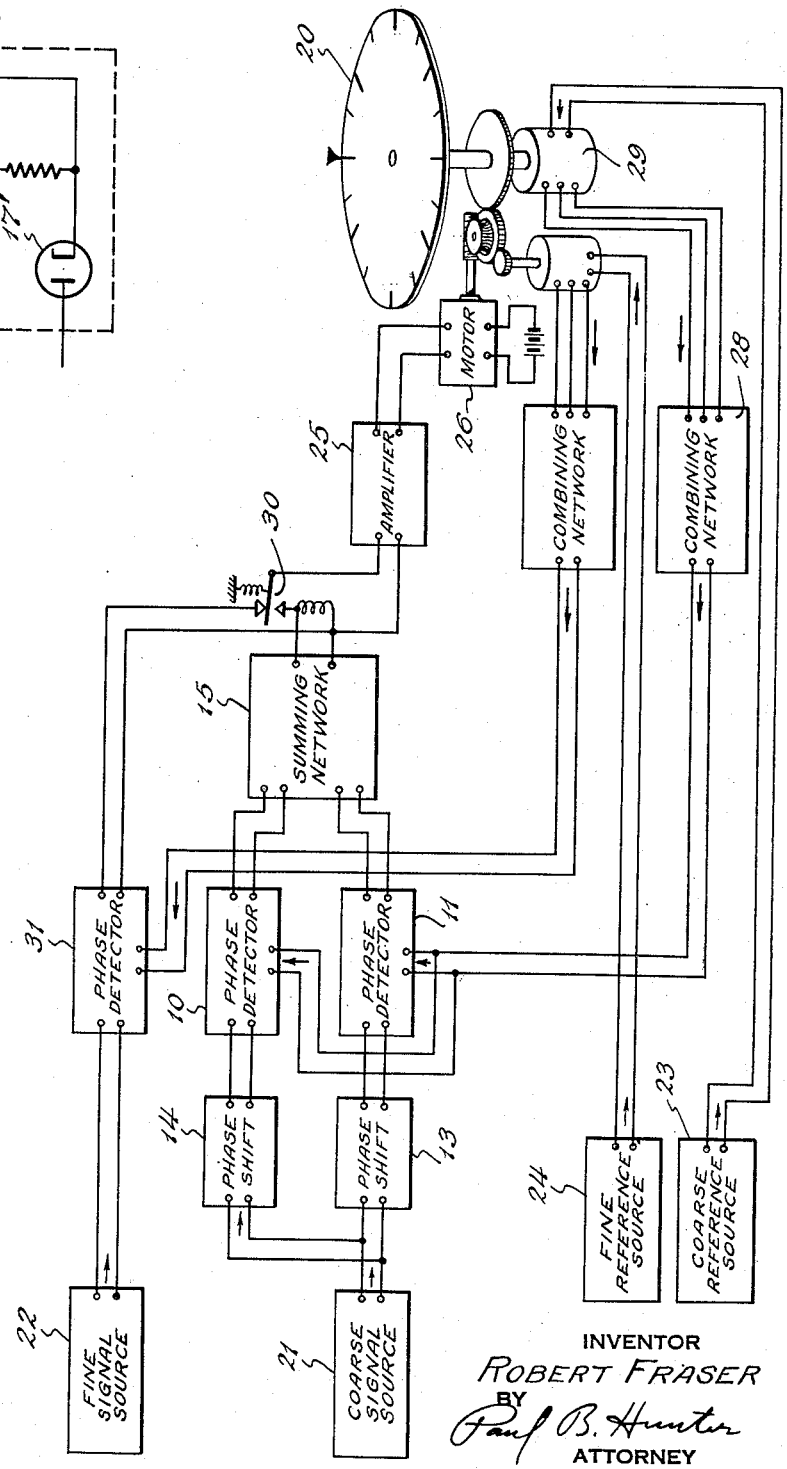
INVENTOR
ROBERT FRASER
BY
Paul B. Hunter
ATTORNEY United States Patent Office 2,703,380
Patented Mar. 1, 1955

2,703,380

PHASE COMPARISON APPARATUS FOR DATA TRANSMISSION SYSTEMS

Robert Fraser, Huntington Station, N. Y., assignor to The Sperry Corporation, a corporation of Delaware Application September 21, 1949, Serial No. 117,055

5 Claims. (Cl. 318—30)

The present invention relates to phase comparison means and more particularly to an improved combination of phase detectors.

A principal object of the invention is to provide improved phase comparison means with an output characteristic having a broad null.

Another object of the invention is to provide improved phase sensitive means for providing a positive or negative output, suitable for driving a servo-mechanism.

Another object of the invention is to provide phase comparison means suitable for use in data transmission systems of the coarse and fine type.

Another object of the invention is to provide improved means for combining the outputs of a plurality of phase detectors.

These and other objects of the invention will be more fully understood when considered in conjunction with the following specification and figures of which:

Fig. 5 is a schematic diagram of the alternate form of the summing network portion of Fig. 3; and Fig. 6 is a block diagram of the invention used in a fine and coarse data system.

Figure 1:
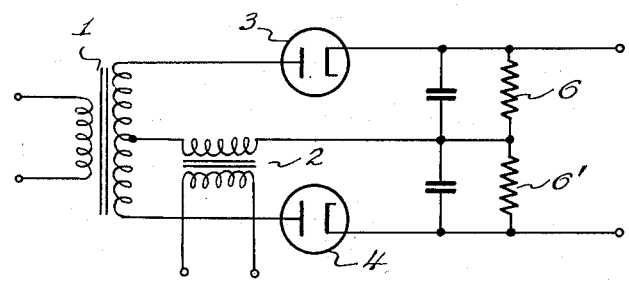
Fig. 1 is a schematic diagram of a conventional phase detector of the sum and difference type.

Fig. 1 illustrates a conventional amplitude-sensitive sum and difference type phase detector of the prior art. The two voltages to be compared in phase are applied to the transformers 1 and 2. They are added in one half of transformer 1 and subtracted in the other half, and the sum and difference outputs are rectified in diodes 3 and 4, the outputs of which are applied oppositely to the output resistors 6 and 6'.

When the two applied voltages are 90° or 270° apart in phase the rectified outputs are equal and opposite and the combined output is zero. The maximum output is obtained when the two applied voltages are in phase or 180° out of phase, and at these points the polarities of the phase detector outputs are opposite.

Figure 2:
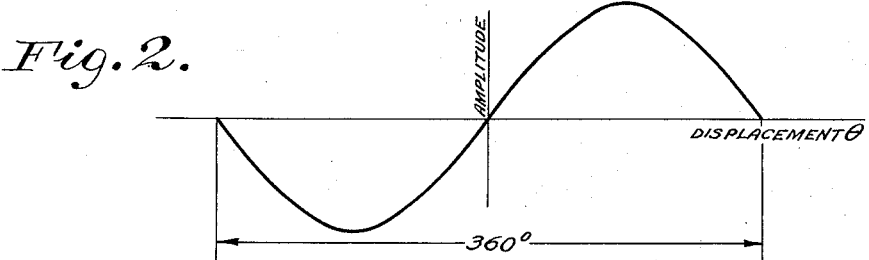
Fig. 2 is the output characteristic of the phase detector of Fig. 1.

Fig. 2 illustrates a characteristic curve of a conventional amplitude-sensitive phase detector showing its output vs. input phase displacement which is substantially a sine function. It is seen that there is an inherent ambiguity in the system as there is zero output for two conditions 180° apart, namely, a 90° phase difference and a 270° phase difference and the characteristic has the same degree of slope at all cross-over points. This ambiguity reduces the effective range of the conventional phase detector considerably.

The present invention removes this ambiguity and provides a broad null at the correct cross-over point. This is achieved in the present invention by operating two conventional phase detectors in parallel, advancing the phase of the unknown voltage in one and delaying it in equal amount in the other and combining the respective outputs in a polarity sensitive double diode circuit. This will be fully discussed in connection with Fig. 3.

Figure 4:
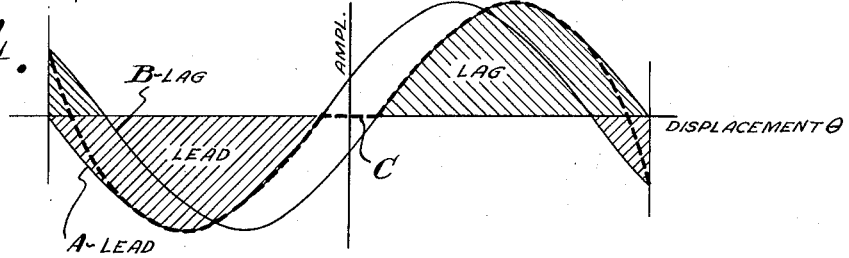
Fig. 4 is a group of plots of the operating characteristics of the embodiment of Fig. 3.
Figure 3:
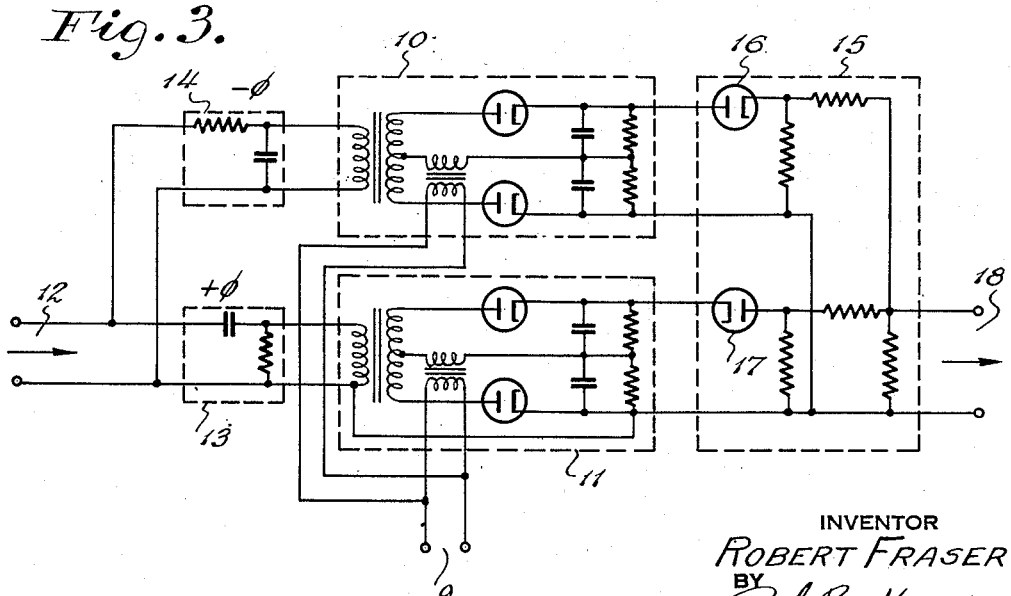
Fig. 3 is a schematic diagram of an embodiment of the present invention.

Fig. 3 illustrates an embodiment of the invention and Fig. 4 illustrates its operating characteristic. The embodiment of Fig. 3 comprises primarily a pair of conventional phase detectors 10 and 11, operated in parallel, each of which is similar to that shown in Fig. 1. The phase of the input voltage applied to terminals 12 is advanced in phase shifter 13 and then applied to phase detector 11. The same input voltage is delayed in phase an equal amount by phase shifter 14 and then applied to the other phase detector 10. The reference voltage is applied on terminals 9 which are connected directly to each phase detector.

Referring to Fig. 4, there are shown the operating characteristics A and B of the two phase detectors. The lagging phase detector 10 characteristic is shown by curve B and the leading phase detector 11 characteristic is shown by the curve A. The dotted curve C is the output of the two phase detectors after their separate outputs have been combined in combining means 15.

The unidirectional conductive diodes 16 and 17 of the combining means 15 are connected so that the output of the lagging phase detector 10 only passes through the diode 16 when it is positive, and the output of the leading phase detector 11 only passes through the diode 17 when it is negative. These respective conductive portions are indicated by the shaded areas of Fig. 4. Note that there is no conductivity about the central cross-over point. In other words, the combined output C has a broad null point of zero output. At the other cross-over point there is a period where both diodes conduct and overlap so that the combined output has a sharper slope as it crosses the zero line, than either of the separate characteristics. The combined output illustrated by the curve C of Fig. 4 appears across the output terminals 18.

Thus it is seen that the present invention has a characteristic output which is distinguished by a broad accurately defined null point at the reference cross-over point. This type of characteristic resolves any ambiguity as to the correct cross-over point and is useful for certain applications one of which will be discussed in connection with Fig. 6.

Fig. 5 illustrates an alternate form of the summing network 15 of Fig. 3. In this embodiment the diodes 16 and 17' are connected differently in that the midpoint of their output is grounded, so that the combined output is balanced about ground potential.

The diode 17' differs from diode 17 of Fig. 3, in that it is reversed and inserted in the opposite output leg of detector 11. Therefore, there is no effective change in the combined output.

Alternate arrangements of the apparatus of Fig. 3 may be utilized for achieving the same results, and these are deemed to be within the scope of the invention. For instance, instead of using plus and minus phase shifters 13 and 14, only one phase shifter need be used and the other conenction may be made directly. Of course, this will move the output characteristic C curve in phase, but it will be a constant amount and may be compensated for. As a matter of fact, there are generally unavoidable phase shifts in the equipment which must be compensated for anyway, and may be balanced out in this manner.

Also the two phase shifters 13 and 14 may be inserted in the reference voltage input, rather than the signal voltage input as shown with the same result. Another alternative is to substitute time delay networks for the phase shifters and if the frequency is reasonably constant, this will have the same result. Also a single phase shifter may be substituted for the two shown and alternately switched into each channel. The combining means 15 may be used with different type phase detectors than those illustrated at 10 and 11.

The invention is also admirably suited for use in transmission systems which utilize phase measurement and which are of the coarse and fine signal type. Systems for the transmission of angular information of this type, utilize a low frequency to make an approximate or coarse setting in a short time, and then a fine signal of high frequency to make the final adjustment. The operating characteristic of the invention, that is, plot C of Fig. 4, having the flat zero output at the reference point is admirably suited for use in the coarse portion of such a system. In operation, the coarse signal will rapidly drive the servo-mechanism or indicator to an approximate setting which would be within the flat center null portion of the curve C. At this point the fine signal will take over and make the final fine adjustment.

Fig. 6 shows the invention utilized in a system of this type. Fig. 6 is an adaptation of the omni-azimuth navigation system of U. S. Patent No. 2,564,703, issued August 21, 1951, in the names of George Litchford and Joseph Lyman. The object of this system is to receive angular information and position the indicator 20. Coarse and fine signals are provided in order to obtain both speed and accuracy. The signals are here shown by coarse and fine signal sources 21 and 22, and coarse and fine reference sources 23 and 24. In a radio navigation system all of these signal sources would, of course, be in the craft radio receiver.

A coarse reference signal is supplied from source 23 to selsyn transformer 29 which phase shifts it proportionally to the angle of indicator 20. The three phase output of selsyn phase shifter 29 is converted to a single phase voltage in combining network 28, the output of which is then applied to phase detectors 10 and 11.

This phase detector combination of the present invention provides an error output, as previously discussed and illustrated by curve C of Fig. 4, which positions the indicator 20 by means of amplifier 25 and motor 26 through relay 30.

When the indicator 20 is approximately positioned, that is, within the flat portion of the output characteristic C, then there will be zero output in the coarse channel and the coil of relay 30 will be deenergized. The relay 30 contact will then connect amplifier 25 to the output of the fine channel phase detector 31 for the final adjustment. This application of the invention is only illustrative of the operation of the invention in a coarse and fine data system and other alternative schemes may be used. Circuit details are given in the above-mentioned U. S. Patent No. 2,564,703.

Thus it is seen that the present invention provides a novel combination of phase detectors, which combination resolves ambiguities and has an output characteristic desirable for certain applications. One of these uses, which has been illustrated in Fig. 6, is its application to coarse phase detection in systems of the coarse and fine type.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Comparator means for producing a signal having polarity and amplitude characteristics corresponding to the phase relationship between an input signal and a reference signal comprising, means for phase shifting said input signal, a first phase detector connected to receive said phase shifted input signal and said reference signal for producing a signal as a function of the phase displacement therebetween, the polarity of said signal reversing with reversals in phase of the input signals, a second phase detector connected to receive said input signal and said reference signal for producing a signal as a function of the phase displacement therebetween, the polarity of said signal reversing with reversals in phase of the input signals, opposite polarity unidirectional current paths connected to receive said respective reversible polarity signals, and means connected to both said last-named means to develop potentials of polarity and amplitude correlated to the respective unidirectional currents, whereby a signal is produced having an amplitude as a function of the phase displacement of said input signal from said reference signal, and having a null characteristic determined by the amount of phase shift introduced by said phase shift means.

2. Comparator means for producing a signal having polarity and amplitude characteristics corresponding to the phase relationship between an input signal and a reference signal comprising, means for advancing and retarding the phase of said input signal by equal amounts, a first phase detector connected to receive said phase advanced input signal and said reference signal for producing a signal as a function of the phase displacement therebetween, the polarity of said signal reversing with reversals in phase of the input signals, a second phase detector connected to receive said phase retarded input signal and said reference signal for producing a signal as a function of the phase displacement therebetween, the polarity of said signal reversing with reversals in phase of the input signals, a first diode connected to receive said first reversible polarity signal, a second diode connected in polarity opposite that of said first diode to receive said second reversible polarity signal, and means connected to both said last-named means to develop potentials of polarity and amplitude correlated to the respective unidirectional currents passed by said diodes, whereby a signal is produced having an amplitude as a function of the phase displacement of said input signal from said reference signal, and having a null characteristic determined by the amount of phase shift introduced by said phase shift means.

3. Comparator means for producing a signal having polarity and amplitude characteristics corresponding to the phase relationship between an input signal and a reference signal comprising, means for phase shifting said input signal, a first phase detector connected to receive said phase shifted input signal and said reference signal for producing a signal as a function of the phase displacement therebetween, the polarity of said signal reversing with reversals in phase of the input signals, a second phase detector connected to receive said input signal and said reference signal for producing a signal as a function of the phase displacement therebetween, the polarity of said signal reversing with reversals in phase of the input signals, a first diode connected to receive said first reversible polarity signal, a second diode connected in polarity opposite that of said first diode to receive said second reversible polarity signal, and means connected to both said last-named means to develop potentials of polarity and amplitude correlated to the respective unidirectional currents passed by said diodes, whereby a signal is produced having an amplitude as a function of the phase displacement of said input signal from said reference signal, and having a null characteristic determined by the amount of phase shift introduced by said phase shift means.

4. In a servomotor control system comprising a motor, a control amplifier therefor, and fine and coarse reversible phase A.-C. error signal sources providing fine and coarse measures of the error existing in said system, a device for eliminating the coarse error signal for a predetermined phase sector each side of the point of synchronism of said system, said device comprising a pair of phase shifters for producing a first coarse signal advanced in phase and a second coarse signal retarded in phase, a pair of phase detectors to which said signals are respectively applied, a source of fixed phase A.-C. reference voltage connected to energize both said phase detectors, each phase detector comprising a balanced pair of diode circuits for providing a differential output of a polarity reversing with reversals in phase of the coarse error signal, opposite polarity unidirectional current paths connected to receive said respective phase detector outputs, and means connected to both said last-named means to develop potentials of polarity and amplitude proportional to the respective unidirectional currents, whereby a coarse output signal is produced having a null for a phase sector determined by the amount of phase displacement introduced by said phase shifters.

5. Comparator means for producing a signal having polarity and amplitude characteristics corresponding to the phase relationship between an input signal and a reference signal comprising, means for phase shifting said input signal, a first phase detector connected to receive said phase shifted input signal and said reference signal for producing a signal as a function of the phase displacement therebetween, the polarity of said signal reversing with reversals in phase of the input signals, a second phase detector connected to receive said input signal and said reference signal for producing a signal as a function of the phase displacement therebetween, the polarity of said signal reversing with reversals in phase of the input signals, unidirectional means connected to receive said phase detector outputs, and a summing network arranged and connected to receive the unidirectional outputs of said last means and produce a signal dependent upon the algebraic sum thereof, whereby said sum signal has an amplitude which is a function of the phase displacement of said input signal from said reference signal, and has a null characteristic determined by the amount of phase shift introduced by said phase shift means.

References Cited in the file of this patent

UNITED STATES PATENTS

| | | |
|---|---|---|
| 2,411,876 | Hansen | Dec. 3, 1946 |
| 2,423,229 | Crosby | July 1, 1947 |
| 2,432,778 | Luck | Dec. 16, 1947 |
| 2,467,361 | Blewett | Apr. 12, 1949 |
| 2,562,329 | O'Brien | July 31, 1951 |
| 2,588,094 | Eaton | Mar. 4, 1952 |
| 2,595,675 | Jaynes | May 6, 1952 |